(12) United States Patent
Billingsley et al.

(10) Patent No.: US 8,617,295 B2
(45) Date of Patent: Dec. 31, 2013

(54) ACTIVE-PARTICULATE AIR FILTER HAVING MONOLITH PRIMARY FILTER AND POLISHING FILTER

(75) Inventors: Britton G. Billingsley, St. Paul, MN (US); Larry A. Brey, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 429 days.

(21) Appl. No.: 12/570,870

(22) Filed: Sep. 30, 2009

(65) Prior Publication Data

US 2011/0072971 A1  Mar. 31, 2011

(51) Int. Cl.
*B01D 50/00* (2006.01)
*B01D 39/14* (2006.01)
*B01D 39/06* (2006.01)
*B01D 46/00* (2006.01)
*F01N 3/00* (2006.01)

(52) U.S. Cl.
USPC .............. 95/273; 55/522; 55/523; 55/524; 422/169; 422/170; 422/171; 422/172; 422/177; 422/178; 422/179; 422/180; 422/181; 422/182; 60/297

(58) Field of Classification Search
USPC ............ 55/522–524; 422/169–172, 177–182; 60/297; 95/273
See application file for complete search history.

(56) References Cited

U.S. PATENT DOCUMENTS

| | | | |
|---|---|---|---|
| 2,038,071 A * | 4/1936 | Wilhelm | ...................... 96/118 |
| 2,920,050 A | 1/1960 | Blacet | |
| 3,172,747 A | 3/1965 | Nodolf | |
| 3,971,373 A | 7/1976 | Braun | |
| 4,484,938 A * | 11/1984 | Okamoto et al. | ............... 96/118 |
| 4,559,066 A * | 12/1985 | Hunter et al. | ............... 96/117.5 |
| 4,981,501 A * | 1/1991 | Von Blucher et al. | .......... 96/153 |
| 5,033,465 A | 7/1991 | Braun et al. | |
| 5,344,626 A | 9/1994 | Abler | |
| 5,492,882 A | 2/1996 | Doughty et al. | |
| 5,496,785 A | 3/1996 | Abler | |
| 5,510,063 A | 4/1996 | Gadkaree et al. | |
| 5,763,078 A | 6/1998 | Braun et al. | |
| 5,804,295 A * | 9/1998 | Braun et al. | .................. 428/323 |

(Continued)

FOREIGN PATENT DOCUMENTS

| | | |
|---|---|---|
| CA | 2606553 | 9/1998 |
| EP | 1666123 A1 | 6/2006 |
| WO | WO 99/15259 | 4/1999 |
| WO | WO 2007/137795 A1 | 12/2007 |

OTHER PUBLICATIONS

International Application No. PCT/US2010/049432 Search Report dated Jun. 3, 2011.

(Continued)

*Primary Examiner* — Amber Orlando
(74) *Attorney, Agent, or Firm* — Karl G. Hanson (57) ABSTRACT

An air filter that includes a primary filter and a polishing filter. The primary filter comprises a monolith 10 that contains active-particulate. The air-to-be-filtered travels through the primary filter in a path generally parallel to the passageways 12. The polishing filter 36 has first and second major surfaces and also contains active-particulate. The polishing filter is generally arranged such that air travels from the first major surface to the second major surface when passing through it. The inventive filter demonstrates extraordinary performance over the same primary and polishing filters taken individually.

20 Claims, 4 Drawing Sheets

(56) References Cited

U.S. PATENT DOCUMENTS

| | | | |
|---|---|---|---|
| 5,914,294 A | 6/1999 | Park et al. | |
| 6,102,039 A | 8/2000 | Springett et al. | |
| 6,234,171 B1 | 5/2001 | Springett et al. | |
| 6,273,938 B1 | 8/2001 | Fanselow et al. | |
| 6,280,824 B1 | 8/2001 | Insley et al. | |
| 6,284,705 B1 | 9/2001 | Park et al. | |
| 6,379,407 B1 | 4/2002 | Blackwell et al. | |
| 6,391,429 B1 | 5/2002 | Senkus et al. | |
| 6,413,303 B2 | 7/2002 | Gelderland et al. | |
| 6,589,317 B2 | 7/2003 | Zhang et al. | |
| 6,752,889 B2 | 6/2004 | Insley et al. | |
| 6,986,804 B2 | 1/2006 | Dominiak et al. | |
| 7,004,990 B2 | 2/2006 | Brey et al. | |
| 7,276,098 B2 | 10/2007 | Koslow | |
| 7,309,513 B2 | 12/2007 | Brey et al. | |
| 7,377,963 B2 | 5/2008 | Tanahashi et al. | |
| 7,501,012 B2 | 3/2009 | Tatarchuk et al. | |
| 7,655,070 B1* | 2/2010 | Dallas et al. | 95/154 |
| 8,021,457 B2* | 9/2011 | Dema et al. | 55/527 |
| 2001/0003893 A1 | 6/2001 | Ramos et al. | |
| 2001/0029843 A1* | 10/2001 | Minoru et al. | 96/135 |
| 2002/0177520 A1* | 11/2002 | Tanaka et al. | 502/150 |
| 2003/0011878 A1 | 1/2003 | Maas | |
| 2004/0255785 A1* | 12/2004 | Koslow | 96/154 |
| 2004/0259729 A1 | 12/2004 | Kaiser et al. | |
| 2005/0023211 A1 | 2/2005 | Koslow | |
| 2005/0169820 A1 | 8/2005 | Tatarchuk et al. | |
| 2006/0010199 A1 | 1/2006 | Brailean et al. | |
| 2006/0096911 A1 | 5/2006 | Brey et al. | |
| 2006/0130451 A1* | 6/2006 | Ding et al. | 55/524 |
| 2006/0160200 A1* | 7/2006 | Rathenow et al. | 435/177 |
| 2006/0254427 A1 | 11/2006 | Trend et al. | |
| 2007/0207917 A1 | 9/2007 | Sink et al. | |
| 2007/0261557 A1 | 11/2007 | Gadkaree et al. | |
| 2008/0132408 A1 | 6/2008 | Mitchell et al. | |
| 2009/0065436 A1* | 3/2009 | Kalayci et al. | 210/679 |
| 2010/0291213 A1* | 11/2010 | Berrigan et al. | 424/484 |
| 2011/0293485 A1* | 12/2011 | Dallas et al. | 422/129 |

OTHER PUBLICATIONS

Cahela, Donal R. et al., *Design of Polishing Filter Adsorbents using Sintered Microfibrous Metallic Networks as Carriers for High Effectiveness Sorbent Particulates*, 2003.

*Activated Carbon in Environmental Remediation*, pp. 508-510, Elsevier Press (2006).

\* cited by examiner

ACTIVE-PARTICULATE AIR FILTER HAVING MONOLITH PRIMARY FILTER AND POLISHING FILTER

The present invention pertains to a new active-particulate air filter that includes both a monolith and a polishing filter. The invention also pertains to a method of making an active-particulate air filter that contains both a monolith and polishing filter and to a method for filtering air using such a filter.

BACKGROUND

Active-particulate is commonly used in filters to remove gaseous contaminants from air. Examples of such air filters are shown in U.S. Pat. Nos. 7,501,012, 7,004,990, 6,391,429, 5,763,078, 5,510,063, 5,344,626, and International Publication WO99/15259. Monoliths and corrugated active-particulate gaseous filters also have been developed—see for example, U.S. Pat. Nos. 7,276,098, 6,413,303, 6,273,938, 5,914,294, and 3,172,747. Monoliths, however, have not been good candidates for respiratory air filtration—see *Activated Carbon In Environmental Remediation*, pp. 508-510, Elsevier Press (2006). Although a variety of filter constructions have been developed over the years for filtering air, there have not been any monolithic active-particulate air filters that also have used an active-particulate polishing filter. Nor has there been any recognition of the extraordinary improvements in air filtration that may be provided by such a combination. As indicated below, the present invention provides such a combination.

SUMMARY OF THE INVENTION

The present invention provides an air filter that comprises (a) a monolithic primary filter that comprises active-particulate in its generally parallel passageways; and (b) a polishing filter that has first and second major surfaces and that also contains active-particulate. The polishing filter is generally arranged relative to the monolithic filter such that air exiting the monolithic filter will travel from the first major surface to the second major surface when passing therethrough.

The present invention also provides a new method of making an air filter, which method comprises: (a) providing a monolithic filter that comprises an inlet end and an exit end and that comprises active-particulate in its generally parallel passageways; and (b) juxtapositioning a polishing filter to the monolithic filter at the exit end thereof The present invention further provides a method of filtering air, which method comprises (a) introducing the air to a first end of a monolithic filter that contains active-particulate; (b) passing the air through the monolithic filter in a direction parallel to the passageways such that the fluid exits the monolithic filter at a second end; and then (c) passing the air through a polishing filter.

The present invention differs from known active-particulate filters in that it uses a monolith active-particulate filter in combination with an active-particulate polishing filter and in that the air-to-be-filtered travels through the primary monolithic filter parallel to the passageways with the polishing filter being arranged generally normal to this air movement. The inventors discovered that extraordinary improvements in gaseous filtration performance can be achieved through such a combination of filter elements, particularly over each of those elements individually and what they would be expected to provide in combination. The filtration performance is so extraordinary that the inventive filters may be suitable for use in respiratory air filtration—that is, in filter cartridges and other devices that provide clean filtered air for persons to breathe.

Glossary

Figure 1:
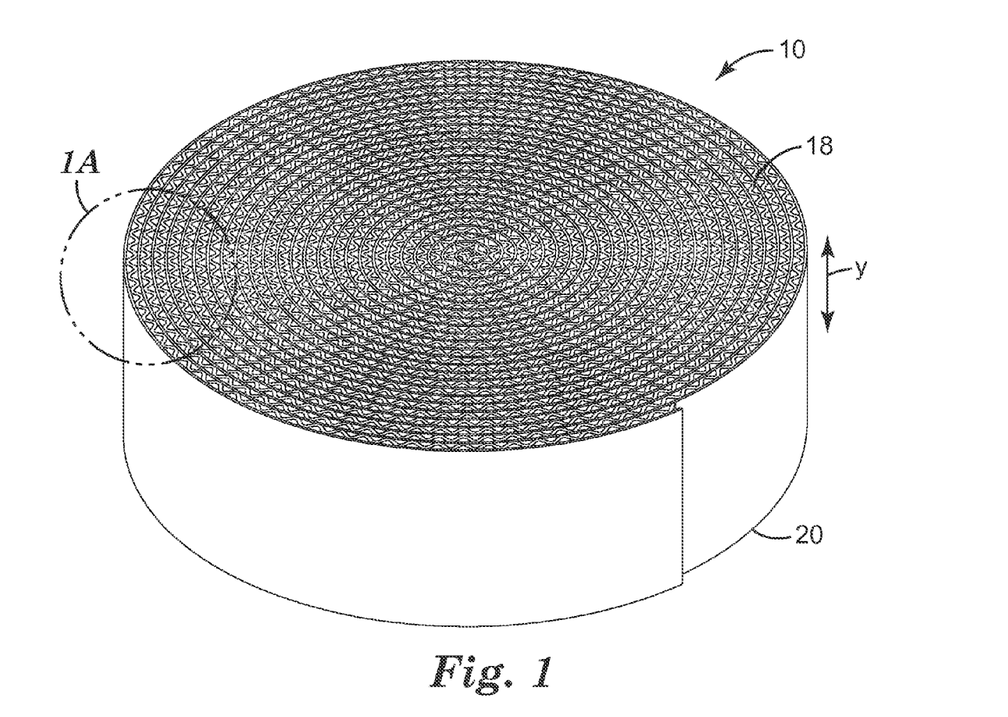
FIG. 1 is a perspective view of a monolithic filter 10 that may be used in the present invention.

"active-particulate" means particles or granules that are specially suited to perform some action or function on a fluid or components of a fluid, the action or function being, for example, contaminant removal or molecular alteration or catalysis;

"air" means a mixture of gasses that forms the earth's atmosphere and that mainly contains nitrogen and oxygen and may contain small amounts of other molecules like argon, $CO_2$, neon, and helium;

"clean air" means a volume of atmospheric ambient air that has been filtered to remove contaminants;

"contaminants" means particles (including dusts, mists, and fumes) and/or other substances that generally may not be considered to be particles (e.g., organic vapors, et cetera) but which may be suspended in air;

"corrugated" means having a series of peaks and valleys, which may be u-shaped or v-shaped;

"enmeshed" means held within the interstitial space of another medium;

"air filter" means an article that removes undesired component(s) from air to provide clean air for a person to breathe;

"juxtaposed" means placed next to each other but not necessarily in direct contact with one another;

"longitudinal dimension" means in the direction through (not across) the openings, that is, in the direction of the dimension "y" noted in FIG. 1;

"monolithic filter" means a filter that contains a series of generally parallel passageways through which a fluid-to-be-filtered can pass therethrough;

"parallel to the corrugations" and "parallel to the passageways" means in the same general direction as the longitudinal dimension of the corrugations or the passageways;

"polishing filter" means a filtering layer(s) that is located downstream to a primary filter and that is arranged such that the air-to-be filtered flows through a tortuous path(s); and "primary filter" means the filter(s) that plays a fundamental role in the performance of a filtering device.

DETAILED DESCRIPTION OF PREFERRED EMBODIMENTS

Figure 1A:
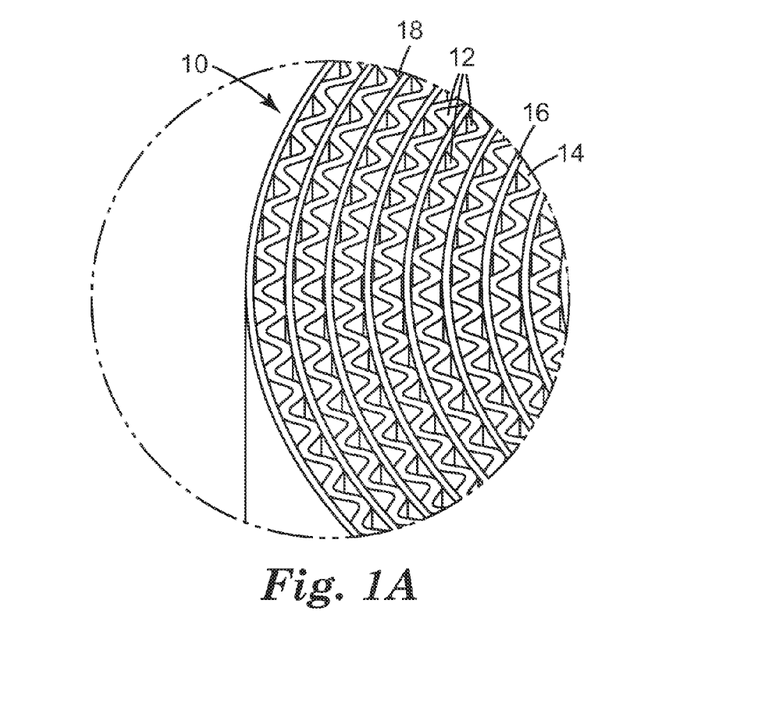
FIG. 1a illustrates an enlarged section of the monolithic filter 10 shown in FIG. 1.

FIGS. 1 and 1a illustrate an example of a monolithic filter 10 that may be used as a primary filter in an air filter of the present invention. The monolithic filter 10 has a series of generally parallel passageways 12 that are defined by a corrugated filter layer 14 and a retaining layer 16. The retaining layer 16 serves to maintain the corrugated filter layer 14 in its corrugated condition and may also help define the parallel passageways 12. The monolithic filter 10 also has a first inlet end 18 and a second exit end 20. The fluid-to-be-filtered travels from the first inlet end 18 through the generally parallel passageways 12 and out the second exit end 20. The corrugated filter layer 14 contains active-particulate that is suited to perform some action or function on the air, or components of the air, that pass through the generally parallel passageways. As such, the active-particulate is in fluid communication with the air that passes through the passageways 12. The retaining layer 16 can be a solid sheet, or it may be a series of strands or fibers or a nonwoven fibrous web—see U.S. Pat. No. 5,763,078 to Braun et al. for examples of shape-retaining means that may be used to maintain a corrugated pattern. The shape-retaining layer also may contain active particulate, for example, in a nonwoven fibrous web or held together by PSA microparticulate—see U.S. Pat. No. 3,971,373 to Braun, U.S. Pat. No. 6,391,429 to Senkus et al., and U.S. Pat. No. 6,234,171 and U.S. Pat. No. 6,102,039 to Springett et al. The corrugated filter layer 14 allows the fluid-to-be-filtered to make direct contact with the active-particulate. As illustrated, the passageways may be u-shaped. They also may take on other configurations when viewed in cross-section. For example, the passageways may be v-shaped, triangular, rectangular, pentagonal, hexagonal, etc.

Figure 2:
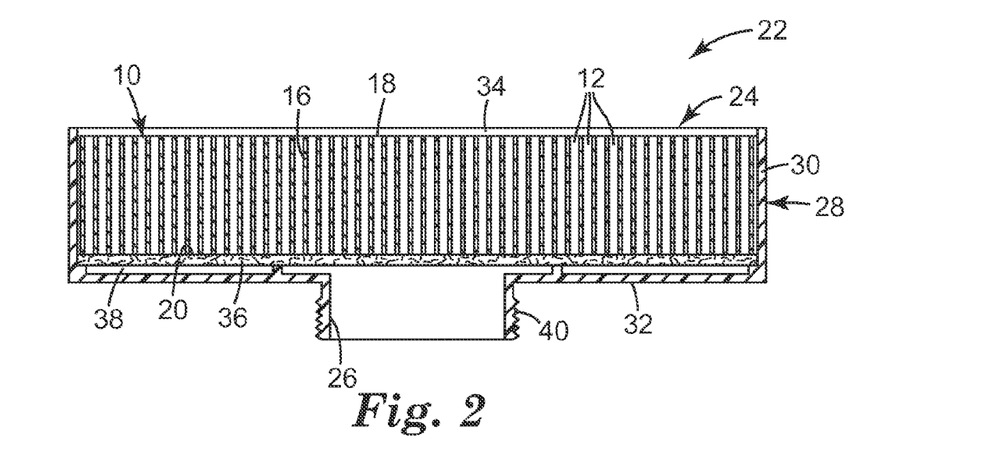
FIG. 2 is a partial cross-section of a filter cartridge 22 in accordance with the present invention.

FIG. 2 shows a filter cartridge 22 in cross-section. The cartridge 22 has an air intake surface 24 and an air exit port 26. A housing 28 is defined by one or more sidewalls 30 and a base 32. A monolithic filter 10 is disposed within the housing 28. A porous cartridge cover 34 is disposed at the first inlet end 18 of the monolithic filter 10. A polishing filter 36 is located at the second exit end 20 of the monolithic filter 10. The air-to-be-filtered passes through the cartridge cover 34 to enter the monolithic filter 10 at the first inlet end 18. The air then passes through the generally parallel passageways 12 to exit the monolithic filter 10 at the second exit end 20. The air then passes through the polishing filter 36 after exiting the monolithic filter 10. Subsequently, the air passes through a plenum 38 and then through the exit port 26. The filter cartridge 22 also may include a series of threads 40 so that the cartridge can be secured to a mask body that is worn over the nose and mouth (and eyes) of a person. Alternatively, a bayonet connection or a snap-fit connection may be used—see U.S. Patent Application Publication 2005/0145249A1 to Solyntjes et al., U.S. Pat. No. 5,579,761 to Yuschak et al., and U.S. Pat. No. 5,062,421 to Burns et al. Filter cartridges of the present invention may be used on a variety of half-mask and full-face respirators and hoods. Examples of such respirators are disclosed in the following patents: U.S. Pat. No. 7,419,526 to Grear et al., U.S. Pat. No. 7,104,264 to Lee et al., U.S. Pat. No. 6,895,960 to Fabin, U.S. Pat. No. U.S. Pat. No. 6,874,499 to Viner et al., and U.S. Pat. No. 6,227,178 to Holmquist-Brown et al. Filter cartridges of the present invention also may be used in conjunction with powered air purifying respirators (PAPRs). Examples of PAPRs are described in U.S. Pat. Nos. 6,948,191 and 6,823,867 to Avery et al., and U.S. Pat. No. 6,666,209 to Bennett et al. The invention also could be used on a larger scale to provide collective filtration protection for persons in buildings and temporary facilities such as tents and personnel containment structures—see, for example, U.S. Pat. Nos. 7,425,521 and 6,383,241.

Figure 3:
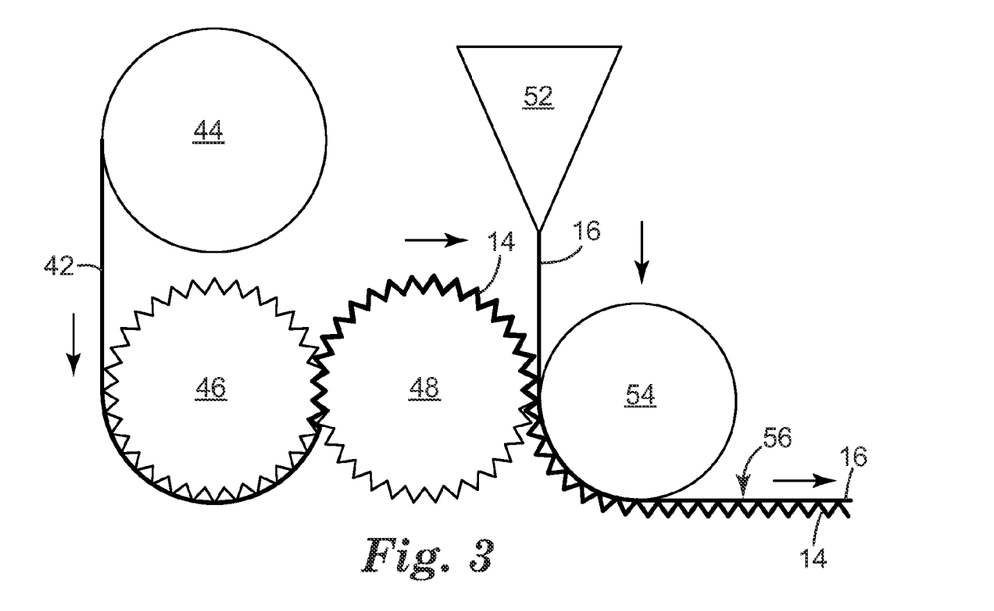
FIG. 3 illustrates a method of making a composite structure 56 that is suitable for creating a monolithic filter that can be used in conjunction with the present invention.

FIG. 3 illustrates a method of making a layer filter media that may be used to form a monolith in accordance with the present invention. In making a layer of corrugated filter media that may be used in a monolith of the present invention, a web 42 that comprises active-particulate enmeshed in polymeric fibers is drawn from a roll 44 onto a first tooth roll 46 that mates with a second tooth roll 48 to form a pair of corrugating rolls. When the teeth of the first roll 46 mate with the second roll 48, the web 42 undertakes a corrugated or pleated pattern. A shape-retaining layer or sheet 16 is then applied to the corrugated web 14 to assist in retaining it in its pleated or corrugated condition. The shape-retaining sheet 16 may be drawn from a film extruder 52 between tooth roll 48 and a driving or back-up roll 54. The driving roll 54 may be heated to cause the retaining sheet 16 to become bonded to the corrugated structure 14 to form a composite structure 56, which includes the corrugated layer 14 and the retaining sheet 16. The composite structure 56 may be wound upon a take-up roll where it can be subsequently converted into a monolith that is suitable for use in a filter of the present invention.

Webs that may be used as a starting material for forming a composite structure that is suitable for making the monolith in accordance with the present invention are described, for example, in U.S. Patent Application Publications 2006/0096911A1 to Brey et al. and 2006/0254427A1 to Trend et al. The starting web material that can be corrugated to provide a series of parallel passageways. The passageways are generally non-tortuous in that they extend in a pre-defined path. The passageways may be straight or may follow a curved path but tend to be generally unobstructed. The passageways may comprise a porous sheet article that includes a self-supporting non-woven web of polymeric fibers and sorbent particles that are enmeshed in the web. The sorbent particles may be enmeshed in the web, typically, such that there is at least about 60 weight percent sorbent particles enmeshed in the web. The fibers used in the particle-containing web typically have sufficiently greater crystallization shrinkage than similar fibers. The fibers typically comprise polypropylene, and the sorbent particles are typically evenly distributed in the web so that the web has an Adsorption Factor A of at least $1.6 \times 10^4$/millimeters (mm) water. The porous sheet articles typically exhibit a low pressure drop, have a long service life, and have an Adsorption Factor A exceeding that of packed-bed carbon. The Adsorption Factor A can be calculated using parameters or measurements similar to those described in Wood, JOURNAL OF THE AMERICAN INDUSTRIAL HYGIENE ASSOCIATION, 55(1):11-15 (1994). Further information regarding Adsorption Factor A may be found in either of the patent applications cited above in this paragraph. These webs are good candidates for forming monoliths since the active-particulate retains much of its filtering/sorption function despite being subject to conditions necessary to create the monolith. Monoliths that may be suitable for use in the present invention also may be made by extrusion processes where a polymer or ceramic paste is extruded with the active particulate. Alternatively, a polymer block containing passageways may be partially carbonized and then activated. See U.S. patent documents 2008/0132408, 2007/0261557, and U.S. Pat. No. 6,284,705 for discussions of carbon monoliths. In a typical air filter of the present invention, the passageways in the monolith are about 0.1 to 100 square millimeters ($mm^2$) in cross-sectional area, more typically about 0.5 to 20 $mm^2$ in a cross-sectional area. The length of the passageways in the monolith may be about 0.5 to 100 centimeters (cm), more typically about 2 to 10 cm. For filter cartridge use, the passageways are about 1 to 5 cm long.

Polishing layers that may be used in connection with the present invention can have a construction similar to the components described above for use in making the monolith. Unlike the material that comprises the passageways of the monolith, the polishing filter would necessarily be porous or permeable to air since the air passes through the layer itself rather than passageways formed by the layer(s). Relative to the monolith, the air passes through tortuous paths in a porous medium when passing through the polishing filter. Packed beds of active-particulate also may be used as well as permeable shaped structures of active-particulate which are held together with, for example, PSA microparticulate—see U.S. Pat. No. 6,391,429 to Senkus et al.—or bonded sorbent particulate as described in U.S. Pat. No. 5,033,465 to Braun et al. An example of a fibrous matrix that contains active particulate, and which could serve as a polishing filter in the present invention is shown in U.S. Patent Application No. 2005/0169820 A1. Depending on the application, the polishing layer may be in direct contact with the monolith exit. The polishing layer also may be spatially separated downstream to the exit, for example, 0.5 centimeters (cm) to 100 cm downstream. The polishing filter typically has a thickness of about 0.1 to 20 millimeters (mm), more typically about 0.5 to 3 mm.

The active-particulate that may be used in the monolithic and polishing filters of the present invention include particles or granules that are suited to perform some action or function attributable to some characteristic or property, including chemical change properties such as reaction, catalysis, and ion exchange, and/or physical properties such as high surface area, porosity, and relatively small size and shape. One example of active-particulate are particles that interact with components in a fluid to remove or alter their composition. The components in the fluid may be sorbed onto or into the active-particulate, or they may be reacted to make their composition more benign. The active-particulate accordingly may be sorptive, catalytic, or reactive. Examples of active-particulate materials that may be used in connection with the present invention include sorbent microparticulate granules, such as active carbon, chemically surface-treated activated carbon, alumina, silica gel, bentonite, kaolin diatomaceous earth, powdered zeolites (both natural and synthetic), ion exchange resins and molecular sieves, and particulates such as catalytic particles and particles containing encapsulated compounds. Commonplace active-particulates include activated carbon, chemically-treated carbon, and alumina particulate. Examples of commercially available activated carbon that may be used in the present invention include Kuraray 12×20 type GG (available from Kuraray Chemical Corporation, Osaka, Japan and Calgon 12×30 URC available from Calgon Carbon Corporation, Pittsburgh, Pa. Patents that describe various types of active-particulate that may be used in the present invention include U.S. Pat. No. 7,309,513 to Brey et al., and U.S. Pat. No. 7,004,990 and U.S. Pat. No. 6,391,429 to Senkus et al., U.S. Pat. Nos. 5,763,078 to Braun et al., and U.S. Pat. No. 5,496,785 to Abler.

Figure 4:
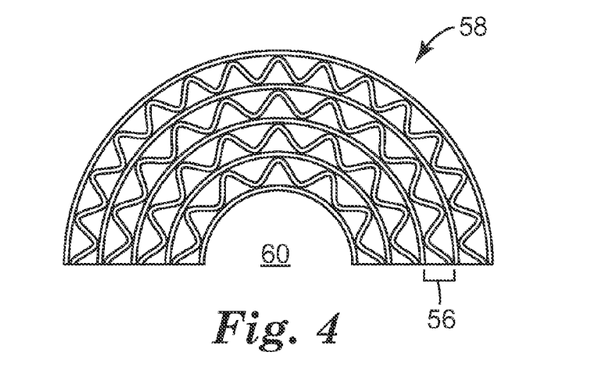
FIGS. 4-6 illustrate alternative constructions for filters according to the present invention.

FIG. 4 shows an end view of an example of a monolith 58 that may be used in connection with the present invention. The composite structure 56 may be assembled into a plurality of layers, which are placed in a u-shaped configuration. A polishing filter can be disposed at the exit end of the u-shaped monolith 58. A plenum also may be disposed at the exit end of the u-shaped monolith 58, which directs the filter fluid into the channel 60 where the filter fluid may be directed to another location.

Figure 5:
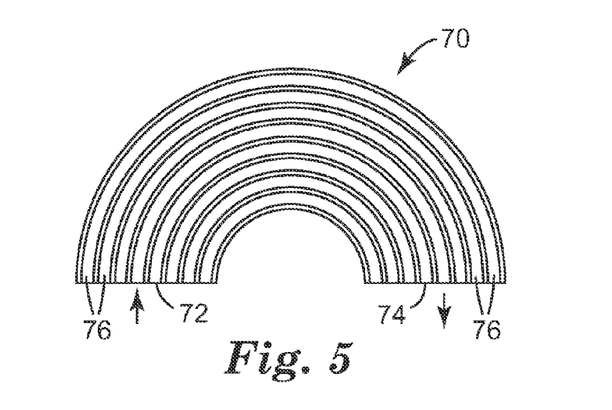

FIG. 5 illustrates an alternative u-shaped structure, where the fluid enters the alternative monolith 70 at inlet end 72 and exits at end 74. In this embodiment, the passageways make a 180° turn from the inlet 72 to the exit 74. The passageways 76 have variable lengths moving in the direction from inlet 72 to exit 74. A plenum also may be provided at the exit end 74, which directs the collected fluid to another conduit.

Figure 6:
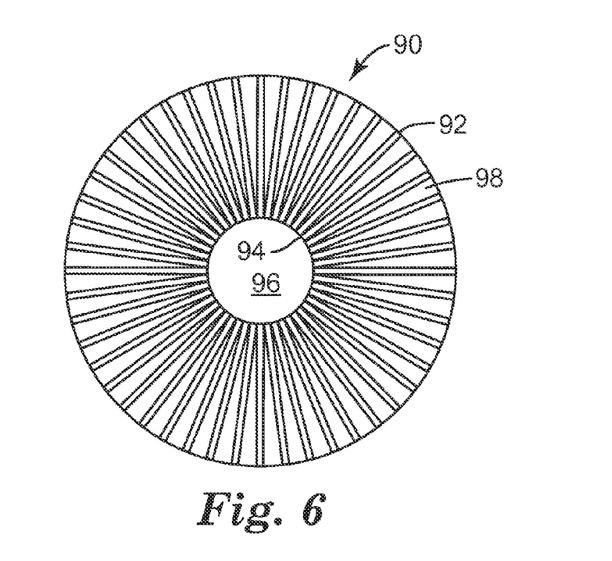
Figure 7:
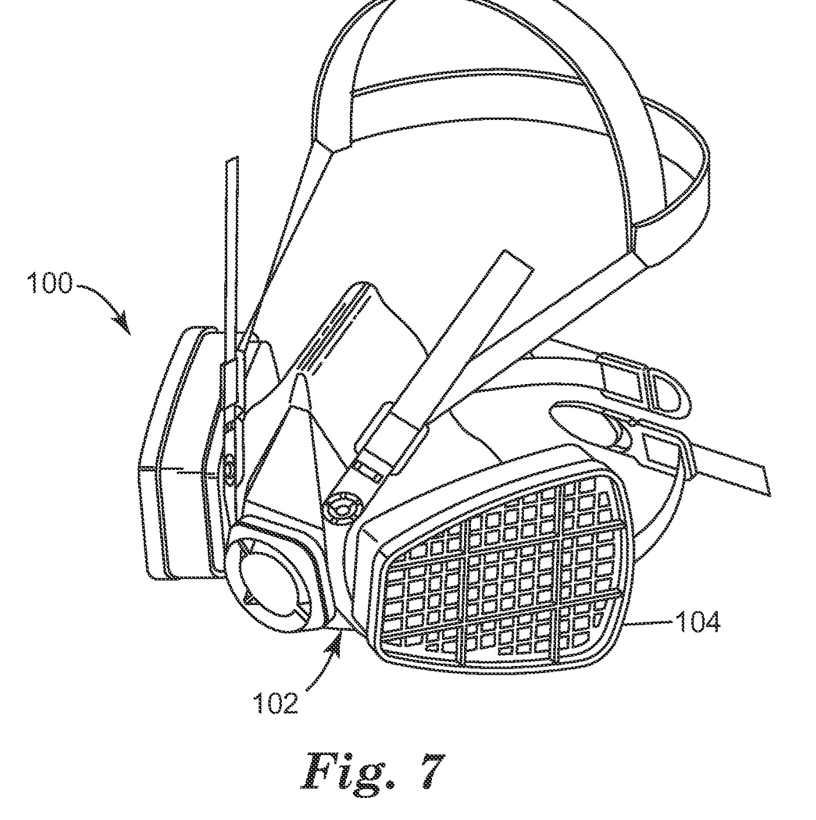
FIG. 7 shows a respirator 100 that has a mask body 102 and filter cartridges 104 in accordance with the present invention.

FIG. 6 shows a disc-shaped filter 90 where the fluid enters the filter at inlet end 92 and exits at 94. The center of the disc 96 forms a plenum through which the filtered air may be collected before passing through a polishing filter. Alternatively, the center 96 of the disc filter may have the polishing filter located therein so that the fluid that exits the filter 90 at the second exit end 94 can immediately be filtered again by the polishing filter. The passageways 98 are shown to be converging in diameter moving from the inlet 92 to the outlet 94. Examples of other monoliths that may be suitable for use in the present invention are shown in U.S. Pat. No. 6,986,804 to Dominiak et al., U.S. Pat. No. 6,752,889 to Insley et al., U.S. Pat. No. 6,413,303 to Gelderland et al., U.S. Pat. No. 6,273,938 to Fanselow et al., U.S. Pat. No. 5,914,294 to Park et al., U.S. Patent Application Publication 2008/0132408A1 and EP1,666,123A1. As shown in FIG. 7, a respirator 100 of the present invention may have a mask body 102 that has filter cartridges 104 of the present invention attached thereto.

EXAMPLES

Pressure Prop Test

The test method was similar to NIOSH Test method RCT-APR-STP-0007. Test flow rate was 42.4 liters per minute (lpm). The filter was attached directly to the equipment using an adapter and was not attached to a headform. Equivalent equipment was used.

Service Life Test

To determine the service lives of the filtration devices, they were challenged with 1000 parts per million (ppm) of cyclohexane at 10 liters per minute and at 50% relative humidity. The amount of time that elapsed when the devices allowed 5 ppm of cyclohexane to exit the filter determined the service life. The test method was similar to NIOSH Test method RCT-APR-STP-0046. Equivalent equipment was used.

Sample Assembly

A corrugated monolith filter media was made in the following manner.

A carbon loaded web was produced using the technique described in U.S. Patent Application Publication US2006/0254427. The polymer chosen for the web was Vistamaxx™ 2125, and the carbon was a 80×325 organic vapor carbon from Philippine Japan Carbon Corporation. The ratio of polymer to carbon was 30:70. The total basis weight of the web was 350 grams per square meter ($g/m^2$).

The web was calendared from 0.055 inches (1.397 mm) to 0.020 inches (0.51 mm) at approximately 170° F.

The calendered web from step 2 was then corrugated between two geared rolls, each having 10 teeth per inch. The corrugations were created using the process illustrated in FIG. 3.

With reference to that figure, the corrugating rolls 46 and 48 were set at 110° F. and 170° F., respectively. The back up roll for the extrusion was cooled to 40° F. The gap between rolls 48 and 54 was set at 0.050 inch (1.27 mm) A polypropylene film was extruded using Total™ 5571 polypropylene, which had a melt temperature of 450° F. The film thickness was 0.1 mm. The corrugated carbon loaded webs were laminated to the polypropylene film 16 between roll 48 and the extrusion back up roll 54. The laminating pressure was 50 PLI (lbs per linear inch). The resulting web was wound up in a roll.

The polishing filter was made from a roll of carbon loaded BMF web that was produced using the same process described above except that the polymer to carbon ratio was 10:90 and the carbon was FHW 40×140 from PACCO International, Warrendale, Pa. The total weight of the web was 450 $g/m^2$.

The filtration devices were assembled for evaluation in 34 millimeter (mm) diameter tubes. The polishing web was placed perpendicular to the air flow and the corrugated primary filter was parallel to the air flow. Three (3) inches (76.2 mm) of corrugated primary filter material was used in the filtering devices. The corrugated material was slit into 3 inch (7.62 cm) strips, wound into a cylinder with the air channels parallel to the long direction, and then was glued into the 34 mm tube. The polishing web was also glued perpendicular to the 34 mm diameter cylinder. Six samples were prepared: four Comparative examples (C1-C4) and two Inventive Examples (I5-I6). The samples were tested for pressure drop and service life as described above. The results are set forth below in Table 1:

TABLE 1

| Example | Polishing web | Corrugated filter | Pressure drop @ 42.5 lpm (mm water) | Mass of carbon (grams) | Cyclohexane service life (minutes) |
|---|---|---|---|---|---|
| C1 | x |   | 19.3 | 0.55 | 0.5 |
| C2 | x |   | 19.1 | 0.48 | 0 |
| C3 |   | x | 15.9 | 12.60 | 0 |
| C4 |   | x | 21.1 | 12.64 | 17.5 |
| I5 | x | x | 33.6 | 11.23 | 36 |
| I6 | x | x | 32 | 11.94 | 38 |

The data set forth in Table 1 demonstrate that extraordinary filter service lives can be achieved by constructions that use both primary and polishing filters according to the present invention. The Inventive Examples I5 and I6 have pressure drops that are greater than the pressure drops of the Comparative Examples C1 to C4 by 113% ((33.6−15.9)/15.9×100) at most, but exhibit service life extensions that are infinitely larger ((38−0)/0×100) at best and 106% ((36−17.5)/17.5× 100) at worst.

This invention may take on various modifications and alterations without departing from its spirit and scope. Accordingly, this invention is not limited to the above-described but is to be controlled by the limitations set forth in the following claims and any equivalents thereof.

This invention also may be suitably practiced in the absence of any element not specifically disclosed herein.

All patents and patent applications cited above, including those in the Background section, are incorporated by reference into this document in total. To the extent there is a conflict or discrepancy between the disclosure in such incorporated document and the above specification, the above specification will control.

What is claimed is:

1. An air filter that comprises:
    (a) a monolithic primary filter that comprises activated carbon in its generally parallel passageways; and
    (b) a polishing filter that has first and second major surfaces and that also contains activated carbon, the polishing filter being generally arranged such that air travels from the first major surface to the second major surface when passing therethrough.
2. The air filter of claim 1, wherein the activated carbon in the monolithic filter is enmeshed in a fibrous web.
3. The air filter of claim 2, wherein the fibrous web comprises polymeric fibers that contain a thermoplastic elastomer.
4. The air filter of claim 3, wherein the activated carbon comprises activated carbon.
5. The air filter of claim 1, wherein the activated carbon removes contaminants from the air by sorption.
6. The air filter of claim 2, wherein the activated carbon in the polishing filter is enmeshed in a fibrous web.
7. The air filter of claim 2, wherein the fibrous web is corrugated.
8. The air filter of claim 7, wherein the corrugations are held in place by a sheet.
9. The air filter of claim 8, wherein the sheet comprises a nonwoven fibrous web that contains activated carbon.
10. The air filter of claim 1, wherein the monolith comprises an extruded structure that contains activated carbon.
11. A filter cartridge that comprises the air filter of claim 1.
12. A respirator that comprises a mask body and the air filter of claim 1.
13. A method of making an air filter, which method comprises:
    (a) providing a monolithic filter that comprises an inlet and an exit and that comprises activated carbon in its generally parallel passageways; and
    (b) juxtapositioning a polishing filter to the monolithic filter at the exit thereof.
14. The method of claim 13, wherein the polishing filter is positioned normal to the air travel direction through the monolithic filter, and wherein air travels through a tortuous path when passing therethrough.
15. The method of claim 14, wherein the polishing filter comprises activated carbon in a nonwoven fibrous web.
16. The method of claim 15, wherein the monolithic filter comprises a corrugated web that contains activated carbon.
17. The method of claim 16, wherein the activated carbon is enmeshed in a fibrous web.
18. A method of filtering air, which method comprises:
    (a) introducing the air to a first end of a monolithic filter that contains activated carbon in its passageways;
    (b) passing the air through the monolithic filter in a direction parallel to the passageways such that the fluid exits the monolithic filter at a second end; and then
    (c) passing the air through a polishing filter.
19. The method of claim 18, wherein the polishing filter has first and second major surfaces, at least one of the first and second major surfaces being arranged generally perpendicular to fluid flow through the monolithic filter, the air passing through tortuous passageways when travelling from the first major surface to the second major surface.
20. The method of claim 18, wherein the monolith comprises activated carbon in an extruded structure.

* * * * *

UNITED STATES PATENT AND TRADEMARK OFFICE
CERTIFICATE OF CORRECTION

PATENT NO. : 8,617,295 B2  Page 1 of 1
APPLICATION NO. : 12/570870
DATED : December 31, 2013
INVENTOR(S) : Britton Billingsley

It is certified that error appears in the above-identified patent and that said Letters Patent is hereby corrected as shown below:

In the Specification

Column 5
Line 46, delete "Pa." and insert -- PA. --, therefor.

Column 6
Line 22, delete "Prop" and inert -- Drop --, therefor.

Signed and Sealed this
Second Day of September, 2014

Michelle K. Lee
*Deputy Director of the United States Patent and Trademark Office*